United States Patent [19]

Margraf

[11] Patent Number: 5,529,592
[45] Date of Patent: Jun. 25, 1996

[54] FILTERING SEPARATOR

[76] Inventor: Adolf Margraf, Am Schleplingsbach 46, D-31655 Stadthagen, Germany

[21] Appl. No.: 319,855

[22] Filed: Oct. 7, 1994

[30] Foreign Application Priority Data

Oct. 12, 1993 [DE] Germany .......................... 43 34 699.5

[51] Int. Cl.$^6$ ............................................. B01D 46/04
[52] U.S. Cl. ................... 55/284; 55/294; 55/302; 95/280
[58] Field of Search ................ 95/279, 280; 55/284, 55/293, 294, 301, 302, 303

[56] References Cited

U.S. PATENT DOCUMENTS

| | | | |
|---|---|---|---|
| 3,487,609 | 1/1970 | Caplan | 55/284 |
| 3,505,792 | 4/1970 | Dahlem | 55/294 |
| 3,951,627 | 4/1976 | Barr, Jr. et al. | 55/284 |
| 4,233,041 | 11/1980 | Noland | 55/294 |
| 4,356,010 | 10/1982 | Zv Riemsloh | 55/302 |
| 4,367,080 | 1/1983 | Kordas | 55/302 |
| 4,468,240 | 8/1984 | Margraf | 55/294 |
| 4,632,679 | 12/1986 | Klimczak | 55/284 |
| 4,921,511 | 5/1990 | Dreischmeier | 55/294 |
| 5,002,594 | 3/1991 | Merritt | 55/294 |

FOREIGN PATENT DOCUMENTS

| | | |
|---|---|---|
| 0034645 | 9/1981 | European Pat. Off. . |
| 0191718 | 8/1986 | European Pat. Off. . |
| 2147979 | 3/1973 | Germany . |
| 2450751 | 3/1976 | Germany . |
| 2518377 | 11/1976 | Germany ................ 55/294 |
| 3111502 | 9/1985 | Germany . |
| 54-108978 | 8/1979 | Japan ................ 95/279 |
| 2095127 | 9/1982 | United Kingdom . |

*Primary Examiner*—Jay H. Woo
*Assistant Examiner*—Duane S. Smith
*Attorney, Agent, or Firm*—Panitch, Schwarze, Jacobs & Nadel

[57] ABSTRACT

A filtering separator with a reverse-flow cleaning apparatus has a chamber that travels inside the clean gas area and is provided with a compressed air supply line plus at least one injector. The chamber is divided into a suction area for the drawing in of secondary flush gas and a pressure area. In the wall of the suction area of the chamber there are provided openings with check valve-like blocking elements for the drawing in of the secondary flush gas from the clean gas area. Compressed air injectors may be provided in the clean gas air in front of these blocking elements to assist opening them. A wall of the chamber adjacent to the filter element section of the filter separator may be made of a flexibly bendable material and may further be provided with inflatable hollow bodies in its edge regions to allow the chamber wall to conform to the wall dividing the crude gas air from the clean gas area of the separator.

6 Claims, 4 Drawing Sheets

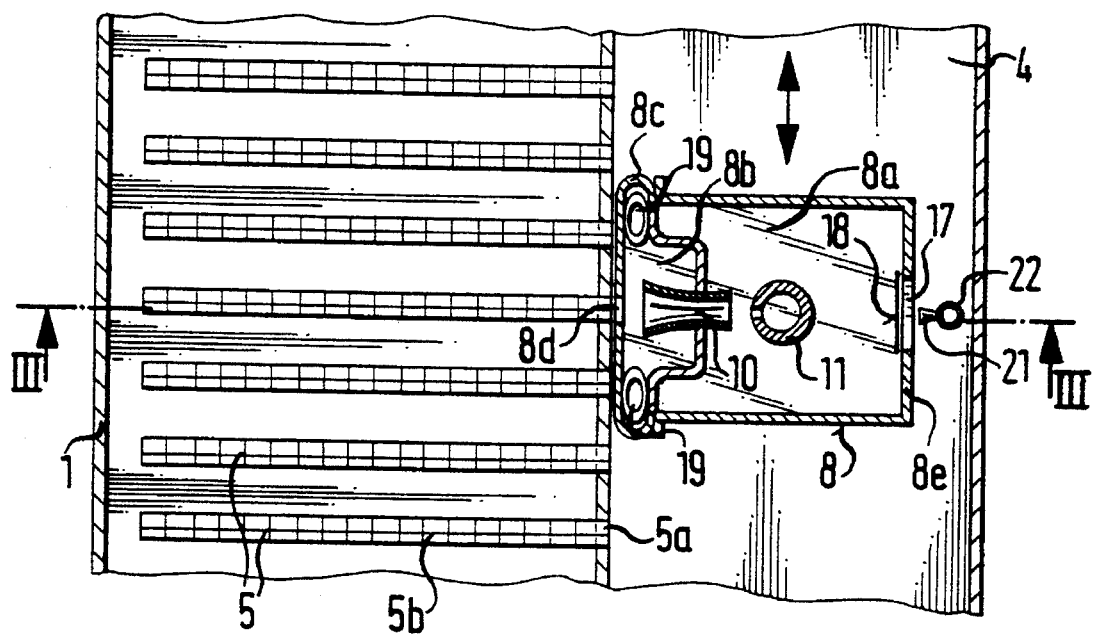

FILTERING SEPARATOR

FIELD OF THE INVENTION

The invention relates to a filtering separator, whose housing is divided into a crude gas area and a clean gas area by means of a housing dividing wall that is provided with parallel rows of openings. Allocated to these openings are connecting openings of filter elements placed in the crude gas chamber, whose filter material is impinged upon by the particle-containing crude gas from the outside towards the inside and is supported by spacing elements located on the inside. For the purpose of reverse-flow cleaning of filter elements, a chamber can be moved back and forth periodically and stepwise in the clean gas area at the housing dividing wall, while at the same time shrouding the adjacent filter element connecting openings. This chamber has a compressed air supply line with a control valve to at least one injector for the purpose of providing a brief, pulsed supply of compressed air mixed with secondary flush gas drawn by the injector from the clean gas area to the particular filter elements in question that are to be cleaned. The chamber is divided by means of a chamber dividing wall into a suction area on the injector side, and a pressure area, whereby the wall of the pressure area facing the housing dividing wall has openings that overlap the connecting openings of the filter elements to be cleaned at any particular time.

BACKGROUND OF THE INVENTION

Filtering separators with the features described above are especially well-suited for, among other things, the separating of particles that are not liable to agglomerate, whose diameter is less than 10 μm, and whose settling speeds are correspondingly low. The reasons for this suitability lie in the following advantageous characteristic features of this filtering separator.

The chamber, which is movable in the clean gas area, prevents the resettling onto the filter elements of the particles that have a low settling speed and that have just been cleaned off following the reverse-flow cleaning, which lasts, for instance, about 0.5 seconds, a resettling that makes the continuous operation of a filtering separator significantly more difficult. The chamber keeps the connecting openings of the cleaned filter elements, and of the filter elements that are adjacent to these, separated from the low gas pressure that prevails in the clean gas area for a period of time that is long enough for the settling of the particles. The particles thus make their way to the area underneath the filter elements, and are carried out of the housing by means of apparatus that are part of the filtering separator.

The traveling chamber also prevents the filter material of the filtering elements, which has been puffed up in an outward direction by the pulsed reverse-flow cleaning, from afterwards striking back in a strongly accelerated manner against the spacing elements of the filter elements, so that particles remaining in the filter material are not flung into the clean gas area in the manner of a rug being beaten. Not until the traveling chamber passes the outlet openings of the cleaned filter elements with one of its two side edges, in a sliding manner as a result of the low travel speed of the chamber, are these filter elements again joined, with the clean gas area. The filter material, which had previously been puffed up, thus approaches the support elements relatively slowly, and comes to lie against them in a relatively gentle manner.

A prerequisite for utilization of both advantageous characterizing features is that the chamber wall facing the housing dividing wall lie sufficiently closely against the housing dividing wall during a stop by the chamber.

In German patent DE 31 11 502 C2, a filtering separator is described that, through careful execution of the design, can achieve the effects described above and that can be assessed in a positive manner. What is disadvantageous about this type of construction, however, are those characteristics described in the following.

Since the traveling chamber is enclosed with respect to the clean gas area, the injector or injectors must draw in the secondary flush gas, whose volume should be about four to five times greater than the volume of the compressed air that is released, by means of the injection of compressed air, through a relatively small number of filter elements. As a result, the injectors first and additionally must overcome the flow resistance of the filter elements in question during the drawing in of the secondary flush gas, and must thereafter increase the pressure of the secondary flush gas to such an extent that the reverse-flow cleaning of the filter elements to be cleaned takes place during continuous operation with sufficiently assured effectiveness. Further, the flow resistance of the filtering separator should not exceed the values established during its planning.

With regard to the aspect mentioned above, during utilization of filtering separators constructed in accordance with the above-cited German patent, problems arose particularly with the presence of a higher particle loading of the crude gas ahead of the filtering separator, for example in the order of magnitude of 10 g and above of particles with a low settling speed per $m^3$.

As a consequence of this higher particle loading, the flow resistance of the filter elements increases relatively quickly after a reverse-flow flushing, and as a result, the amount of secondary flush gas drawn in by the injector during the reverse-flow cleaning decreases. In the case of a separator of this type that has been dimensioned in the usual way, the chamber must therefore travel periodically and stepwise at a faster rate, as a preventive measure, if, for example, the flow resistance of the filtering separator should or must remain limited to 150 mm of water (column).

The reduction of the time span for each of the chamber stops for the reverse-flow cleaning is, however, limited by the fact that if the chamber stops for too brief a period after a reverse-flow cleaning, each of which lasts for only a fraction of a second, the particles with a low settling speed cannot settle far enough downward towards the particle removal apparatus of the filtering separator.

The result of these constraints is that, by way of example, the filtering separator must be made with a larger filter surface area and/or the chambers must be made so wide that there are additional filter elements available for the filtering of the crude gas and/or for the drawing in of secondary flush gas. If it becomes necessary, additional injectors must be installed in the suction region of the chamber. The installation of a second traveling chamber in the filtering separator could also be considered. All of these measures have the disadvantage, however, that the set-up expenditure for the filtering separator becomes larger, as does the filter surface area that is not available for the filtration of crude gas, as well as the space requirements for the filtering separator. In addition, the use of compressed air increases as well.

SUMMARY OF THE INVENTION

The object of the invention is therefore to develop a filtering separator of the type described in the introductory section in such a way that, while retaining its advantages and without increasing the size of the required total filter surface area as well as that of the auxiliary equipment that is allocated to it, and while avoiding an increase of the set-up expenditures and the space requirements, a temporarily or permanently higher content in the crude gas of particles with a low settling speed can be reliably separated by the filtering separator and removed from its housing during continuous operation and at an acceptable flow resistance and compressed air usage.

With a filtering separator having the type of construction described in the introduction, this object is achieved by providing the wall that separates the suction area of the chamber from the clean gas area with at least one opening, at which there is located a blocking element that, in the manner of a check valve, makes possible the drawing in of clean gas from the clean gas area as secondary flush gas, but prevents a flow of gas in the reverse direction.

The chamber, which can travel in a periodic and stepwise manner, is, with the exception of its wall facing the housing dividing wall, surrounded by the clean gas area through which the clean gas flows continuously in a quantity per unit of time that is greater than the quantity of secondary flush gas that is briefly needed for the reverse-flow flushing by a factor of, for example, 100 times.

For that reason, if the chamber is divided by means of a chamber dividing wall into an injector-side, pressure area facing the housing dividing wall and a suction area, and if one or more openings are made in the wall that divides the suction area from the clean gas area, then the amount of secondary flush gas needed for the reverse-flow cleaning can flow through these openings to the openings of the injector or injectors. Thus, the quantity of secondary flush gas need not be drawn in by the injector or injectors by means of a relatively small number of filter elements while overcoming a flow resistance that is affected by the quantity of particles in the crude gas.

Since the openings in the suction area wall facing the clean gas area are, in accordance with the invention, combined with a blocking element that prevents, in the manner of a check valve, a flow of gas from the suction area to the clean gas area, and thus from the just-cleaned filter elements to the clean gas area as well, a resettling of particles, including those with a low settling speed, onto these filter elements does not take place. The particles that are removed from the filter element surfaces during the reverse-flow cleaning thus sink down into the space underneath the filter elements and are carried out of the housing of the filtering separator by means of the apparatus provided for that purpose.

In conjunction with this, the blocking element or elements are configured in such a way that they are opened by the drop in pressure brought about inside the suction area of the chamber by the injector or injectors, without any problem-causing delay, and without a flow resistance being created, during the flow into the suction chamber of clean gas to be used as secondary flush gas, that would cause an unsatisfactory reduction in quantity.

On the basis of testing that has been carried out on samples, a suitable material for blocking elements of this type is, for example, a textile material that is coated on one side or both sides and that has a wall thickness of, for example, approximately 2 mm, similar to the filter material of the filter elements.

The engineering that forms the basis of the invention makes possible the use inside the chamber of either a single injector alone or several injectors connected in parallel. In the case of a filtering separator with horizontal filter elements, it is appropriate if a single injector is arranged vertically approximately parallel to the housing dividing wall, or several, for example one or two injectors per filter element to be cleaned during one chamber stop, are arranged horizontally, and perpendicular to the housing dividing wall.

After a reverse-flow cleaning, in order to prevent the possible formation of a gas flow, no matter how small, between the housing dividing wall and the wall of the traveling chamber that covers the filter element openings, and into the clean gas area, which would encourage a resettling of a portion of the particles that were just cleaned off, it is advantageous to make the chamber walls in the above-mentioned area out of a material that can bend flexibly, for example again of a coated textile material. The gas pressure that builds up in the pressure chamber during the reverse flow cleaning, which is higher than that of the chamber surroundings, then presses the flexible wall against the housing dividing wall. As a result of this, the chamber wall conforms itself to a large extent against the housing dividing wall, and compensates for the unavoidable irregularities in the housing dividing wall.

The desired pressing of the chamber wall against the housing dividing wall can be further improved, if a limited 10 additional expenditure is accepted, by the arrangement of one or more inflatable hollow bodies in the region of the edge zone of the flexible pressure chamber wall that faces the housing dividing wall. Such hollow bodies of a deformable material are, for example, manufactured from silicone and connected ahead of or behind the control valve to the compressed air supply line to the chamber. If the hollow bodies are connected behind the control valve, they are inflated at the beginning of the reverse-flow cleaning and are progressively deflated, after the feeding of the compressed air has been completed, by means of the outlet openings that are present in the compressed air supply line ahead of the injectors. As a result of this, the pressing force that increases the pressing of the chamber walls against the housing dividing wall is available for a longer time than in the case of a chamber configuration without the additional hollow bodies. In the follow-on procedures of the chamber, the additional pressing force is then no longer present.

If, however, the hollow body or bodies are connected ahead of the control valve to the compressed air supply line to the chamber, then the pressing force of the chamber wall against the housing dividing wall remains constantly in effect. This alternative solution may be considered if, in a specialized application, the functioning of the filtering separator is extremely dependent upon a tight sealing of the chamber wall against the housing dividing wall. In that case, the hollow bodies are to be dimensioned and arranged in such a way that the pressing force does not hinder the operation of the chamber. In this regard, a material should be chosen for the flexible chamber wall that is sufficiently resistant to abrasion.

The lack of dependence of the strength of the reverse-flow flushing on a temporary extreme increase in the particle content of the crude gas ahead of the filtering separator can be additionally improved by arrangement of one injector in front of each opening that is placed in the suction chamber wall and combined with a blocking element. As a result, each of these injectors is provided with its own compressed air supply line and is impinged upon with compressed air at the same time as or just before the impinging of the compressed air of the injector or injectors installed inside the chamber. By means of an apparatus of this type, the opening of the blocking element, and thus the increase in the amount of flush gas at the beginning of the reverse-flow cleaning, is accelerated, and the volume of flush gas is increased accordingly. The cleaning apparatus of the filtering separator is given an additional functional reserve.

BRIEF DESCRIPTION OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a horizontal cross-section of the second embodiment along line IV—IV of FIG. 3.

The same parts have been assigned the same reference numbers in both embodiments.

DETAILED DESCRIPTION OF PREFERRED EMBODIMENTS

Figure 1:
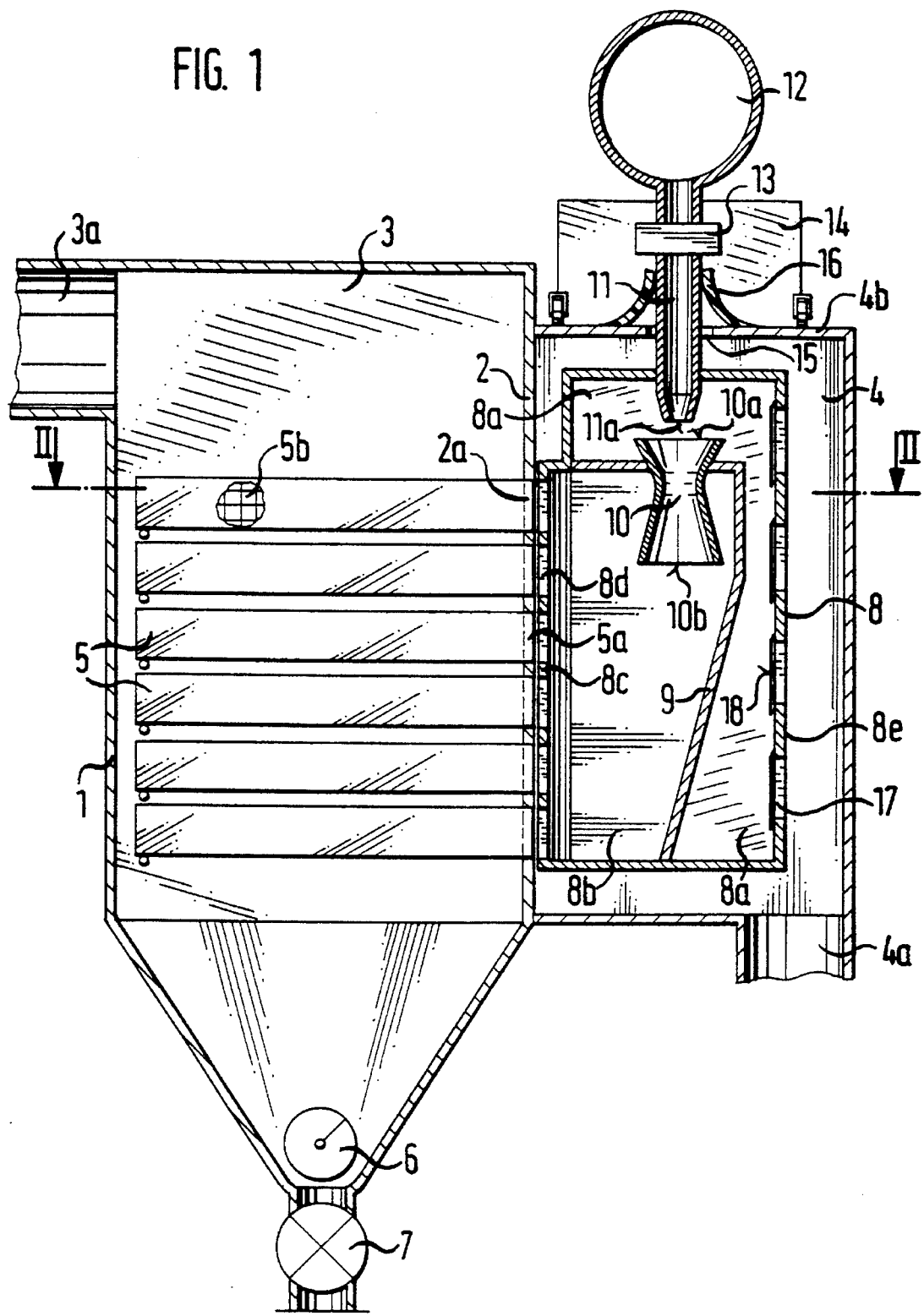
FIG. 1 is a vertical cross-section, along line I—I of FIG. 2, through a simplified and schematically represented filtering separator according to a first embodiment of the invention with an injector located inside the chamber that can travel within the clean gas area.

In FIG. 1 of the drawing, a largely conventional filtering separator is shown, the roughly oval-shaped filter elements of which are arranged horizontally. The filtering separator comprises a housing 1 which is divided, by means of a dividing wall 2 with openings 2a, into a crude gas area 3 and a clean gas area 4. In the crude gas area, the filter elements 5 are arranged in a known manner in parallel rows perpendicular to the dividing wall. The connecting openings 5a of the filter elements overlap the openings 2a of the dividing wall 2, and the filter material of which is supported by spacing elements 5b. The crude gas area 3 is augmented by the crude gas inlet channel 3a, and the clean gas area 4 by the clean gas outlet channel 4a. Underneath the filter elements the housing 1 is configured in a trough-like manner, and is augmented in its lower region by a spiral conveyor 6 and a sluice 7 for carrying from the housing the particles that have settled to the bottom from the filter elements.

The chamber 8 that can travel within the clean gas area is divided into a suction area 8a and a pressure area 8b. The injector or injectors 10 are arranged in the region of openings in the chamber dividing wall 9 in such a way that the intake opening 10a of the injector or injectors faces the suction area 8a, and the injector outlet opening 10b opens into the pressure area 8b. The compressed air supply line 11 is joined with the compressed air tank 12, and is augmented by the control valve 13. Opposite each injector intake opening 10a, the compressed air supply line 11 is provided with a compressed air outlet opening 11a.

Above the clean gas area 4 is the chamber carriage 14, which is indicated schematically. The upper horizontal wall 4b of the clean gas area 4 is provided with a traveling groove 15, which is sealed off on both sides by flexible sealing lips 16.

Figure 2:
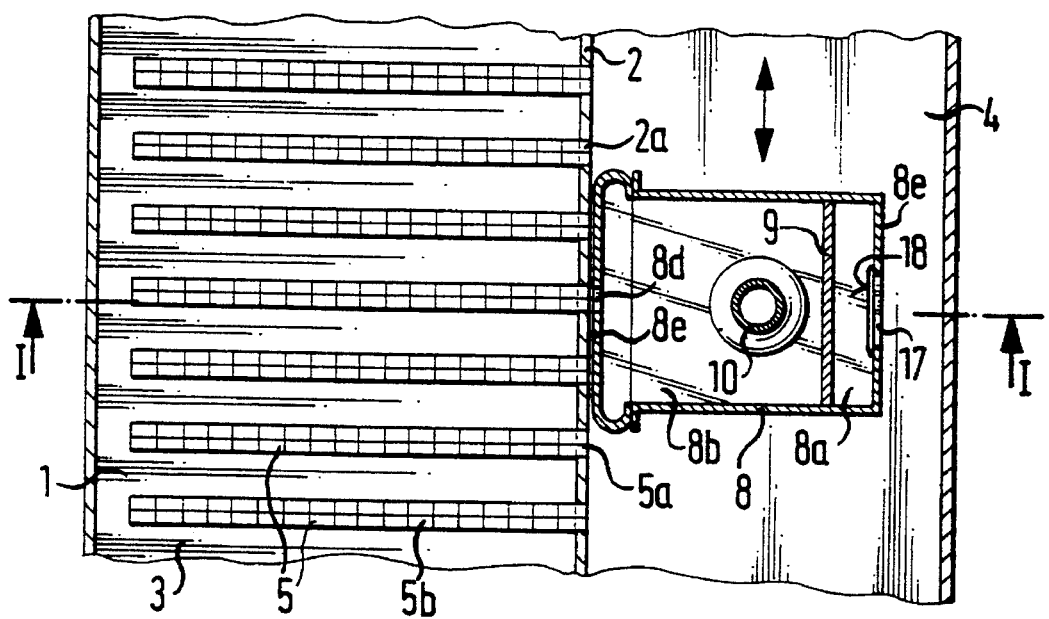
FIG. 2 is a horizontal cross-section of the first embodiment along line II—II of FIG. 1.

The chamber 8 is made to travel (in the direction shown by the double arrow in FIG. 2), in a known manner by means of a drive mechanism (not shown), periodically and stepwise (i.e. in increments) inside the clean gas area 4. In conjunction with this movement, the sealing lips 16 keep the clean gas area 4 sealed off from the surrounding areas.

The chamber wall 8c that faces the housing dividing wall 2 is made of a material that can bend flexibly and has openings 8d that overlap, during the reverse-flow cleaning of the filter elements 5, the openings 2a in the housing dividing wall 2 and the connecting openings 5a of the filter elements 5 that are allocated to them.

In the wall 8e that separates the suction area 8a from the clean gas area 4, there are located openings 17 that are combined with blocking elements 18 on the side of the wall 8e that faces the suction area 8a.

Figure 3:
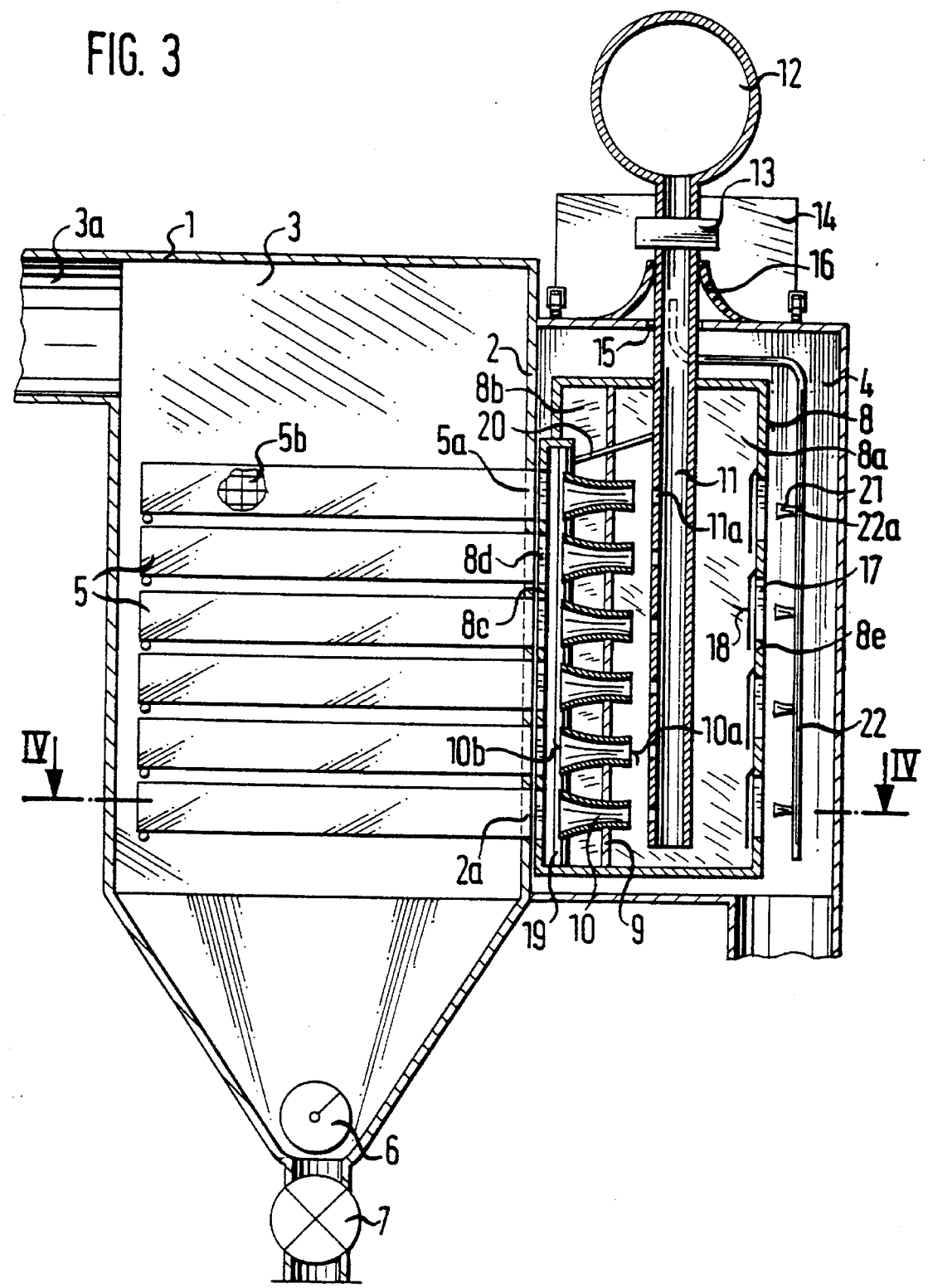
FIG. 3 is a vertical cross-section, along line III—III of FIG. 4, through a filtering separator according to a second embodiment of the invention with a chamber in which one injector is allocated to each filter element to be cleaned.

Shown in FIGS. 3 and 4 are the inflatable hollow bodies 19. These can be manufactured in a single piece as inflatable rectangular edges, or as four individual pieces, in which case each of these hollow bodies is allocated to one of the edge zones of the pressure area 8b. In the example shown, the line 20 joins the hollow body or bodies 19 with the compressed air supply line 11 behind (downstream of) the control valve 13.

Likewise shown in FIGS. 3 and 4, outside of the chamber 8 and in front of the openings 17 and the blocking elements 18 allocated to them, there are additional injectors 21 with compressed air supply line 22 and compressed air outlet openings 22a. Thus, in the example shown, the compressed air supply line 23a is connected at the upper region of the compressed air supply 11 behind the control valve 13.

When the chamber 8, which is proceeding in increments, reaches the row of filter elements that is located alongside of the row of previously cleaned filter elements, the continuing travel of the chamber is interrupted. In this position, the relevant filter element openings 5a overlap with the openings 8d of the flexibly configured chamber wall 8c. The two adjacent rows of filter elements, and thus the row of filter elements previously subjected to a reverse-flow cleaning, are kept sealed off by the chamber wall 8c. If the control valve 13 is then opened briefly, compressed air flows through compressed air supply line 11 to the compressed air outlet openings 11a, so that the injectors 10 are briefly contacted by a released stream of compressed air. As a result of this, a strong drop in pressure takes place in the region of the injector inlet openings, and the gas pressure in the suction chamber 8a also falls below the pressure value that prevails in the clean gas area 4.

The blocking elements 18, which are configured in the manner of a check valve, are opened by the higher gas pressure that prevails inside the clean gas area 4, and clean gas flows through the chamber wall openings 17 to the intake openings 10a of the injectors 10. The pressure of the gas mixture flowing through the injector or injectors increases until the injector outlet opening in question reaches a level that lies significantly above the gas pressure inside the crude gas area 3 of the filtering separator. As a result of this, the flexible chamber wall 8c that separates the pressure area 8b in the direction of the housing dividing wall 2 is pressed tightly against the overlapped filter element connecting openings, and the gas mixture consisting of compressed air and secondary flush gas continues to flow through the openings 8d and 2a, as well as the connecting openings 5a in the filter elements 5 of the middle one of the three rows of filter elements that are overlapped, and brings about the reverse-flow cleaning there.

As a consequence of the termination of the compressed air flow by closing the control valve 13, an equalization of pressure is brought about so that the same pressure prevails in the chamber pressure area 8b and in the chamber suction area 8a as in the crude gas area 3. Since the gas pressure in the clean gas area 4 is lower than the gas pressure in the crude gas area 3 by the amount of filter differential pressure, the blocking elements 18, which are configured in the manner of a check valve, are pressed against the edges of the openings 17 so that a flow of gas cannot form from the crude gas area 3, through the filter elements that have been freed of attached particles as a result of the reverse-flow cleaning, and into the clean gas area 4. Since the gas also cannot flow through the two adjacent rows of filters that are alongside of the row of filters that was freed of particles by means of the reverse-flow cleaning, because their connecting openings 5a have been closed off by the chamber wall 8c, the particles with low settling speed that have been separated from the filter material sink all the way down to the spiral conveyor 6 and, in conjunction with this, are carried from the housing 1 by means of the sluice 7.

With the help of the hollow bodies 19 that can be inflated by means of compressed air, the sealing pressure of the chamber wall 8c against the filter element connecting openings 5a can be increased at the beginning of the reverse-flow cleaning, so that gas mixture that flows from the injector or injectors has to flow, without any leakage in the direction of the clean gas area, into the filter elements that are to be impinged upon for the purpose of the reverse-flow cleaning.

Particularly in the event of high differential pressures between the crude gas area 3 and the clean gas area 4, it is advantageous to speed up the opening of the blocking elements 18 at the beginning of the reverse-flow cleaning. With the help of the additional compressed air supply line 22, this is accomplished with a portion of the compressed air that is being used flowing through the openings 22a and impinging upon the injectors 21 that are arranged outside in front of the blocking elements 18. As a result, the stream of gas that forms in conjunction with this, again consisting of a mixture of compressed air and clean gas, assists the opening of the blocking elements 18 by blowing on them from the outside.

With regard to the compressed air supply for the inflatable hollow bodies, there is also a more expensive solution that is possible, in which the compressed air supply line to the hollow bodies is joined with the compressed air tank by means of a separate, additional control valve. The control valve is opened during each chamber stop, and is closed when the chamber travels on. In conjunction with this, the control valve is configured in such a way that, by means of a vent connection that opens when the control valve closes, the compressed air that is in the hollow bodies can deflate to a level that approximately corresponds to atmospheric pressure.

By accepting the added expenditure that is needed, it is also possible to additionally connect the compressed air supply line to the additional injectors that are placed outside of the travelling chamber by means of an additional, separate control valve at the compressed air tank. The control of this valve is carried out in such a way that the brief feeding of compressed air to the injectors that are located outside of the chamber begins, for example, approximately 0.1 seconds before the feeding of the compressed air to the injector or injectors that are placed within the chamber.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A filtering separator comprising a housing divided into a crude gas area and a clean gas area by means of a housing dividing wall provided with parallel rows of wall openings, filter elements arranged in the crude gas area, said filter elements having connecting openings allocated to the wall openings and a filter material for filtering out particles from a particle-containing crude gas impinging upon the material from outside towards inside of the material, the filter material being supported by spacing elements located on the inside, a chamber which travels back and forth periodically and stepwise in the clean gas area at the housing dividing wall for reverse-flow cleaning of the filter elements, while at the same time shrouding adjacent filter element connecting openings with a portion of the chamber, a compressed air supply line with a control valve connected to at least one injector, located in the chamber, for providing a brief, pulsed supply of compressed air mixed with secondary flush gas drawn in the injector to the particular filter elements to be cleaned, the chamber being divided by means of a chamber dividing wall into a suction area and a pressure area, a wall of the pressure area that faces the housing dividing wall having openings that overlap the connecting openings of the filter elements to be cleaned at any particular time, and a wall that separates the suction area of the chamber from the clean gas area being provided with at least one opening with an associated blocking element that, in the manner of a check valve, makes possible a drawing of clean gas from the clean gas area into the suction area as secondary flush gas, but prevents a flow of gas in a reverse direction, a further injector connected with a compressed air feed line from the control valve arranged outside of the chamber in the clean gas area in front of each blocking element, and a gas outlet opening of the further injector faces the blocking element.

2. A filtering separator comprising a housing divided into a crude gas area and a clean gas area by means of a housing dividing wall provided with parallel rows of wall openings, filter elements arranged in the crude gas area, said filter elements having connecting openings allocated to the wall openings and a filter material for filtering out particles from a particle-containing crude gas impinging upon the material from outside towards inside of the material, the filter material being supported by spacing elements located on the inside, a chamber which travels back and forth periodically and stepwise in the clean gas area at the housing dividing wall for reverse-flow cleaning of the filter elements, while at the same time shrouding adjacent filter element connecting openings with a portion of the chamber, a compressed air supply line with a control valve connected to at least one injector, located in the chamber, for providing a brief, pulsed supply of compressed air mixed with secondary flush gas drawn in the injector to the particular filter elements to be cleaned, the chamber being divided by means of a chamber dividing wall into a suction area and a pressure area, a wall of the pressure area that faces the housing dividing wall comprising a flexible material and having openings that overlap the connecting openings of the filter elements to be cleaned at any particular time, and a wall that separates the suction area of the chamber from the clean gas area being provided with at least one opening with an associated blocking element that, in the manner of a check valve, makes possible a drawing of clean gas from the clean gas area into the suction area as secondary flush gas, but prevents a flow of gas in a reverse direction.

3. A filtering separator comprising a housing divided into a crude gas area and a clean gas area by means of a housing dividing wall provided with parallel rows of wall openings, filter elements arranged in the crude gas area, said filter elements having connecting openings allocated to the wall openings and a filter material for filtering out particles from a particle-containing crude gas impinging upon the material from outside towards inside of the material, the filter material being supported by spacing elements located on the inside, a chamber which travels back and forth periodically and stepwise in the clean gas area at the housing dividing wall for reverse-flow cleaning of the filter elements, while at the same time shrouding adjacent filter element connecting openings with a portion of the chamber, a compressed air supply line with a control valve connected to at least one injector, located in the chamber, for providing a brief, pulsed supply of compressed air mixed with secondary flush gas drawn in the injector to the particular filter elements to be cleaned, the chamber being divided by means of a chamber dividing wall into a suction area and a pressure area, a wall of the pressure area that faces the housing dividing wall having openings that overlap the connecting openings of the filter elements to be cleaned at any particular time, and a wall that separates the suction area of the chamber from the clean gas area being provided with at least one opening with an associated blocking element that, in the manner of a check valve, makes possible a drawing of clean gas from the clean gas area into the suction area as secondary flush gas, but prevents a flow of gas in a reverse direction, the pressure area of the chamber in a region of edge zones of the wall that faces the housing dividing wall being provided with inflatable hollow bodies that are connected to the compressed air supply line.

4. The filtering separator in accordance with claim 2, wherein the pressure area of the chamber in a region of edge zones of the wall that faces the housing dividing wall is provided with inflatable hollow bodies that are connected to the compressed air supply line.

5. The filtering separator in accordance with claim 2, wherein outside of the chamber in the clean gas area in front of each blocking element there is arranged a further injector with compressed air feed line from a control valve, and a gas outlet opening of the further injector faces the blocking element.

6. The filtering separator in accordance with claim 3, wherein outside of the chamber in the clean gas area in front of each blocking element there is arranged a further injector with compressed air feed line from a control valve, and a gas outlet opening of the further injector faces the blocking element.

* * * * *